United States Patent
Schmitt

(10) Patent No.: US 10,288,175 B2
(45) Date of Patent: May 14, 2019

(54) AXIAL SHAFT SEAL

(71) Applicant: BRUSS Sealing Systems GmbH, Hoisdorf (DE)

(72) Inventor: Wolfgang Schmitt, Viernheim (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 519 days.

(21) Appl. No.: 14/965,530

(22) Filed: Dec. 10, 2015

(65) Prior Publication Data

US 2016/0169393 A1 Jun. 16, 2016

(30) Foreign Application Priority Data

Dec. 10, 2014 (EP) .................................... 14197187
Sep. 16, 2015 (EP) .................................... 15185532

(51) Int. Cl.
*F16J 15/32* (2016.01)
*F16J 15/34* (2006.01)
*F16J 15/3244* (2016.01)
*F16J 15/3256* (2016.01)

(52) U.S. Cl.
CPC ....... *F16J 15/3456* (2013.01); *F16J 15/3244* (2013.01); *F16J 15/3256* (2013.01); *F16J 15/3452* (2013.01)

(58) Field of Classification Search
CPC .. F16J 15/3204; F16J 15/3208; F16J 15/3212; F16J 15/3244; F16J 15/3248; F16J 15/3252; F16J 15/3256
See application file for complete search history.

(56) References Cited

U.S. PATENT DOCUMENTS 3,479,728 A * 11/1969 Micai .................. F16J 15/3256
  277/565
4,928,979 A    5/1990 Nagasawa
6,446,976 B1   9/2002 Key et al.
(Continued)

FOREIGN PATENT DOCUMENTS

CN         1487225      4/2004
CN       101113787      1/2008
(Continued)

OTHER PUBLICATIONS

Examination Report for Chinese Patent Application No. 201510870798.X, dated Jun. 19, 2018, pp. 1-6.

*Primary Examiner* — Gilbert Y Lee
(74) *Attorney, Agent, or Firm* — Saliwanchik, Lloyd & Eisenschenk

(57) ABSTRACT

An axial shaft seal for sealing a shaft against a housing of a combustion engine comprises a stiffening section and a sealing element connected to the stiffening section, having a sealing lip which is established for sealing interaction with a counter-running element which is connected to the shaft and runs radially. In the assembled state, a sealing contact exists exclusively between an end section of the sealing lip and the radial counter-running element. A plurality of channels is arranged on the side facing towards the counter-running element and over the periphery of the sealing lip, or on the counter-running surface and over the periphery of the counter-running element, in which a pressure build-up is caused when the shaft is rotating.

19 Claims, 5 Drawing Sheets

(56) References Cited

U.S. PATENT DOCUMENTS

| | | | |
|---|---|---|---|
| 7,017,913 B2 | 3/2006 | Klenk et al. | |
| 7,770,896 B2 | 8/2010 | Foti | |
| 2010/0219588 A1* | 9/2010 | London | F16J 15/3244 |
| | | | 277/559 |
| 2011/0204579 A1* | 8/2011 | Donovan | F16J 15/3244 |
| | | | 277/559 |
| 2012/0299250 A1* | 11/2012 | Yamamoto | C08J 7/123 |
| | | | 277/549 |
| 2013/0175763 A1* | 7/2013 | Berdichevsky | F16J 15/324 |
| | | | 277/552 |
| 2018/0023707 A1* | 1/2018 | Yamaguchi | F16J 15/164 |
| 2018/0038485 A1* | 2/2018 | Yamanaka | F16J 15/3204 |
| 2018/0038486 A1* | 2/2018 | Yamanaka | F16J 15/3204 |

FOREIGN PATENT DOCUMENTS

| | | |
|---|---|---|
| DE | 1 675 397 B1 | 6/1971 |
| DE | 10334896 | 3/2005 |
| DE | 10 2010 047 931 | 4/2012 |
| DE | 102011114349 | 4/2012 |

* cited by examiner

AXIAL SHAFT SEAL

CROSS-REFERENCE TO RELATED APPLICATIONS

The present application claims priority to European Patent Application No. 14 197 187.9, filed on Dec. 10, 2014 and to European Patent Application No. 15 185 532.7, filed on Sep. 16, 2015; both of which are hereby incorporated by reference herein in their entirety, including any figures, tables, or drawings.

FIELD OF USE

The present invention relates to an axial shaft seal to seal a shaft against housing. Embodiments are directed to an axial shaft seal to seal a shaft against a housing, having a stiffening section and a sealing element connected to the stiffening section, where the sealing element incorporates a sealing lip that is established for sealing interaction with a counter-running element that is connected to a shaft and runs radially, where a sealing contact exists exclusively between an end section of the sealing lip and the radial counter-running element in an assembled state.

BACKGROUND OF THE INVENTION

With regard to tougher emissions regulations, there is a constant demand for shaft seals with lower friction to seal the crankshaft. At the same time, sufficient stability of the shaft seal against vacuums and excess pressure in the engine occurring during operation must be ensured; for example, in modern petrol engines, considerable vacuums can occur in the crankcase. In the past, radial shaft seals which are optimised in terms of friction were used to seal the crankshaft, wherein the pressure stabilisation was achieved by suitable geometry of the sealing lip. However, the friction reduction able to be achieved with radial shaft seals is limited.

A mechanical seal for sealing the crankshaft is known from DE 10 2011 114 349 A1 Mechanical seals are very low in friction in general, but consist of a relatively high number of individual parts, require much installation space and are comparatively expensive.

An axial shaft seal is known from FIG. 5 of DE 103 34 896 A1. In the case of this shaft seal, a reliable seal is achieved by three tangential sealing elements, in particular a tangential dust seal, a tangential buffer seal and a sealing collar, but at the price of increased friction.

The axial shaft seal according to EP 2 749 796 A1 also has a dust lip which is supported in a sealing manner on the race over an axial length and which indeed causes a sufficient level of imperviousness to dust, but in turn leads to increased friction. Additionally, the sealing element only has low stability against a vacuum, as the sealing lip is folded back from the race in the case of an engine-side vacuum, due to a weakness close to its connection to the stiffening section, and then completely loses the sealing functionality.

Document U.S. Pat. No. 4,928,979 discloses a shaft seal to seal a shaft against a housing.

BRIEF SUMMARY OF THE INVENTION

Embodiments of the invention provide an axial shaft seal which enables reduced friction, sufficient pressure stability and a reliable sealing of the crankshaft in all operating states, with a simple product design.

Embodiments of the invention incorporate a stiffening section (13) and a sealing element (15) connected to the stiffening section (13), having a sealing lip (16) which is established for sealing interaction with a counter-running element (25) which is connected to the shaft (11) and runs radially, wherein a sealing contact exists exclusively between an end section (18) of the sealing lip (16) and the radial counter-running element (25) in the assembled state, characterised in that a plurality of channels (34; 54) is arranged on the side facing towards the counter-running element (25) and over the periphery of the sealing lip (16), or on the counter-running surface (27) and over the periphery of the counter-running element (25), in which a pressure build-up is caused when the shaft (11) is rotating.

Specific embodiments of the invention are based on the knowledge that, with the aid of an axial seal, by utilising the centrifugal force, seals can be achieved with fundamentally lower friction. In the case of axial shaft seals, in comparison to conventional radial shaft seals, the pressing force of the sealing lip therefore can be adjusted to be lower, without impairing the sealing functionality. Furthermore, it has emerged that a sealing of the crankshaft against fluid which is reliable in all operating states can be achieved by means of a sealing lip, i.e. without further auxiliary seals abutting tangentially onto the race or onto the shaft. It is completely sufficient for the sealing effect according to the invention that a sealing contact exists exclusively between an end region of the sealing lip and the radial counter-running surface in the assembled state. The reduction of the sealing contacts leads, according to the invention, to a reduction of the total friction of the shaft seal.

Due to the centrifugal force support, only a low pressing force of the sealing lip onto the counter-running element is required.

According to embodiments of the invention, a plurality of channels is arranged on the side facing towards the counter-running element over the periphery of the sealing lip, or alternatively on the counter-running surface, in which a pressure build-up is caused when the shaft is rotating. The channels have the task of accumulating air, which circulates due to drag flow at the counter-running element and which pushes outwards due to the centrifugal force, by slipstream, whereby a pressure build-up is generated in the channels. Due to this pressure build-up, the contact force of the lip with the counter-running element is lowered when the shaft is rotating until gas friction sets in in place of the fluid friction, whereby a clear jump in the friction reduction occurs. The thus-pressurised gas pushes the fluid out of the contact zone and pushes it back into the housing (engine, gearbox, etc.).

Preferably, the channels taper outwards, which supports the pressure build-up of the air flowing outwards in the channels to achieve the gas friction. This can, in particular, be achieved by suitable arrangement and formation. The channels are advantageously arranged to be inclined against the radial direction, wherein the inclination against the radial direction preferably ranges between 45° and 89°. Furthermore, the sections between the channels advantageously taper outwards and/or are rounded inwards such that, in a particularly advantageous embodiment, a wing profile between the channels is formed in a top view.

Impairments of the sealing element by pressure fluctuations in the housing are advantageously counteracted by suitable design and connection to the stiffening section. This can advantageously be achieved by an overall U-shaped sealing lip. Preferably, the sealing lip has a section running towards the shaft originating from its free end and, connecting to this, a section running away from the shaft. It has been shown that this design and in particular the section of the sealing lip running away from the shaft counteracts an uncontrolled withdrawal of the sealing lip in the case of pressure fluctuations and in particular vacuums in the housing. Preferably, for this purpose, the section running away from the shaft is at least half as long as the section running towards the shaft.

Additionally, a ring coil spring arranged around the outside of the sealing element can be provided which in particular increases the stability against a vacuum in the housing. Contrary to the ring coil spring of conventional radial shaft seals in which the spring acts in the direction of the pressing of the sealing lip onto the counter-running surface, and therefore in parallel to the sealing direction, the substantial effect direction of the present ring coil spring is perpendicular to the direction of the pressing of the sealing lip onto the counter-running surface, and therefore orientated perpendicularly to the sealing direction. Preferably, the ring coil spring can be arranged around the sealing element without preloading in the case of a stopped engine. Only in the event of a considerable vacuum in the housing the sealing lip is pulled radially outwards and therefore reaches effective contact with the ring coil spring, the elastic expansion thereof and return force connected thereto counteracting a further displacement of the sealing lip radially outwards.

BRIEF DESCRIPTION OF THE FIGURES

The invention is explained below by means of preferred embodiments with reference to the included figures. Shown are.

DETAILED DESCRIPTION OF THE INVENTION

Figure 1:
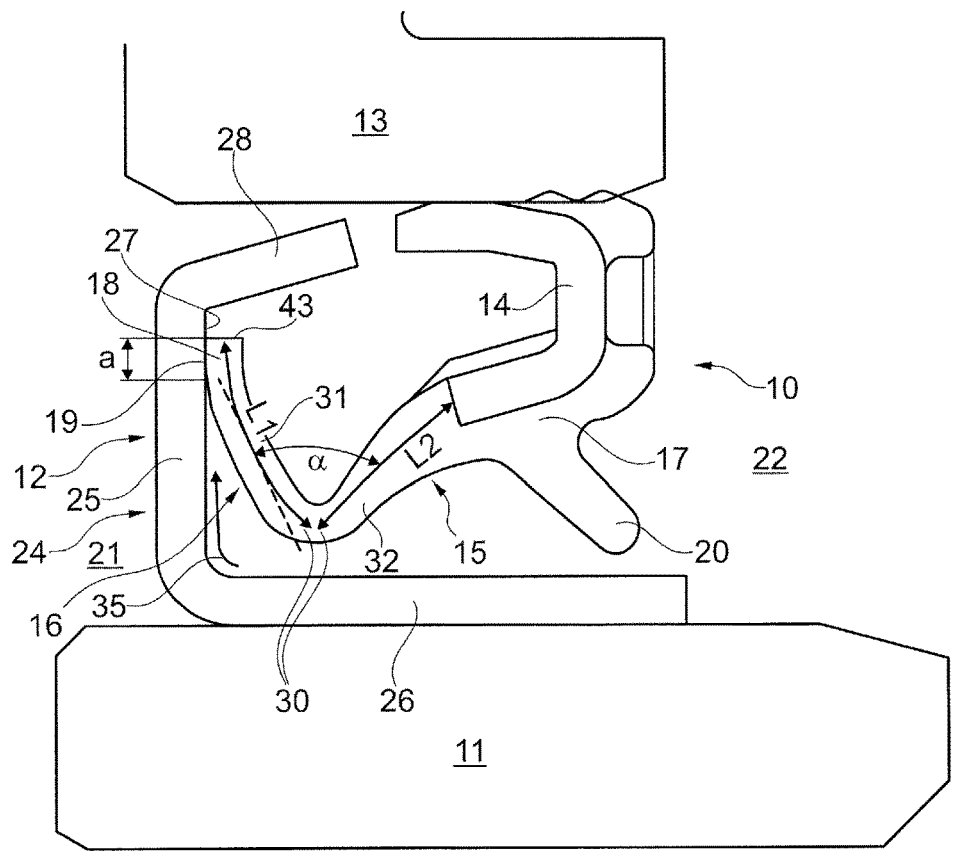
FIG. 1 shows a cross-sectional view of an axial shaft seal according to an embodiment of the invention.

Referring to the Figures, the axial shaft seal 10 to seal a shaft 11, such as a crankshaft, which is guided through an opening 12 in the housing 13 of a combustion engine or gearbox of a motor vehicle, comprises a stiffening section 14, in particular embodiment circular, in particular embodiment made from metal or a plastic, and a sealing element 15, which is vulcanised thereon made from an elastomer. The sealing element 15 comprises a sealing lip 16, a non-contacting dirt lip 20 on the environment side 22 of the shaft seal 10, and a connection part 17 with which the sealing element 15 is connected to the stiffening section 14. The sealing element 15 is advantageously manufactured from one piece and in one production step.

The sealing lip 16 is established for sealing interaction with a radially extending counter-running element 25 in the assembled state and extends, for this purpose, advantageously predominantly axially in the direction towards the counter-running element 25. The counter-running element 25 is connected firmly to the shaft 11. The sealing lip 16 comprises a sealing or end section 18 which is supported flat on the counter-running element 25 in the installed state in a contact region 19 over an axial length a. The sealing lip 16 bulges in the assembled state in a funnel-shaped manner towards the space 21 to be sealed. The sealing lip 16 ends with a lip end 18 which is aligned radially outwards at a flat angle to the rotating counter-running surface 27. The lip end 18 contacts the rotating counter-running element 25 in the form of a circular circumference or circular area tangential. Fluid which wets the counter-running element 25 or the conical extension 28 of the race 24 is spun outwards due to centrifugal force and prevented from passing the fluid space 21 radially inwards by the circular contact of the sealing lip 16. As is evident from FIG. 1, in the assembled state, the single contact of the shaft seal 10 with the shaft-fixed construction 11, 24 is the contact of the end section 18 of the sealing lip 16 with the counter-running element 25. A sealing of the shaft 11 both against fluid and against dust which is reliable in all operating states can be achieved by means of a sealing lip 16 in combination with a conventional non-contact dirt lip 20.

Due to the centrifugal force support, only a low pressing force of the sealing lip 16 onto the counter-running element 25 is required. In this way, a very low friction of the shaft seal 10 can be achieved down to air friction.

In order to ensure the required pressure stability against pressure fluctuations in the space 21 to be sealed, in particular against a vacuum, the sealing lip 16 has a suitable design and connection to the stiffening section 14. In detail, the sealing lip 16 at first extends, in the assembled state, starting from the contact region 19 in the direction towards the shaft 11, until it has reached a point 30 of the shortest distance to the shaft 11. Starting from this point 30, the sealing lip 16 moves away from the shaft 11 again. The length L2 of the section 32 of the sealing lip 16 which runs away from the shaft 11 advantageously amounts to at least 50%, more preferably to at least 60%, even more preferably to at least 70% of the length L1 of the section 31 of the sealing lip 16 which runs towards the shaft 11. The section 32 of the sealing lip 16 running away from the shaft 11 is particularly effective at increasing the stability against a vacuum in the space 21 to be sealed. The angle α between the two sections 31, 32 of the sealing lip 16, each measured in the centre of the sections 31, 32 and at the point 30 nearest to the shaft, advantageously ranges, in the assembled state, between 40° and 100°, preferably between 40° and 80°, even more preferably between 40° and 70°. As is evident from FIG. 1, the sealing lip 16 is preferably U-shaped overall.

In the embodiment shown, the counter-running element 25 is advantageously formed from a race 24 which is wound onto the shaft 11 with an axial pipe section 26. Alternatively, the counter-running element 25 can be formed from the shaft 11 itself as a radial flange. The sealing lip 16 is a free or moveable part of the sealing element 15, contrary to the immoveable connection part 17.

Figure 2:
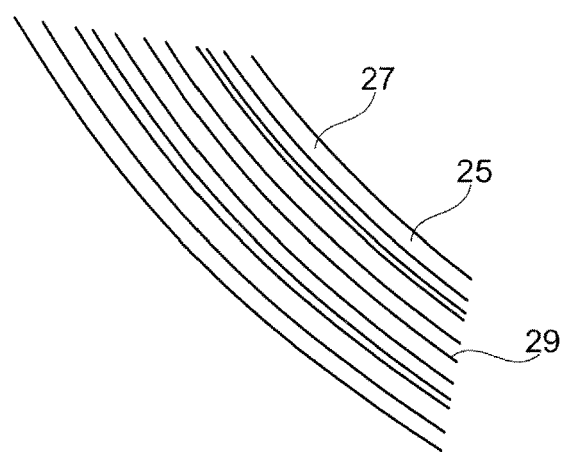
FIG. 2 shows a top view in the section of the contact region of the limiting element, with respect to the embodiment shown in FIG. 1.

The counter-running element 25 or the counter-running surface 27 advantageously can be equipped in the lip contact zone 19 with a conveyor spiral groove 29 shown in FIG. 2 which supports the conveyor effect back into the fluid chamber 21. Alternatively, the counter-running surface 27 can be designed without structure.

Figure 3:
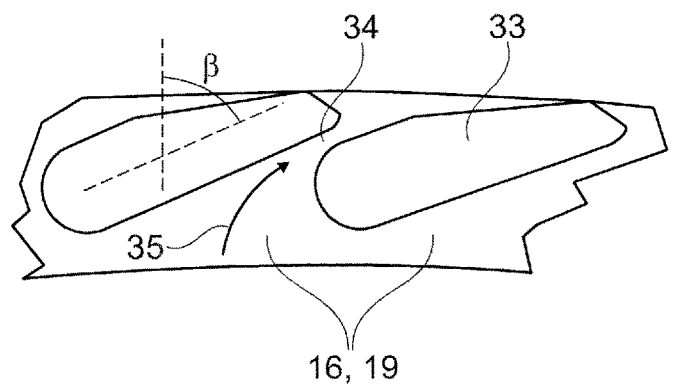
FIG. 3 shows a top view in the section of the contact region of a sealing lip in one embodiment of the invention.

In the embodiment according to FIG. 3, the sealing lip 16 has a plurality of elevations 33 in the contact region 19 over the periphery of the sealing lip 16 which are projected or raised over the surface of the sealing lip 16. Therefore, channels 34 are formed between the elevations 33, said channels 34 having a radial component. In the case of a rotating shaft 11, air 35 is spun radially outwards on the counter-running element 25 (see FIG. 1) and thereby pushed into the channels 34 (see FIG. 3), whereby a pressure is built up which lowers the contact force with which the sealing lip 16 abuts onto the counter-running element 25 until gas friction sets in in place of the fluid friction. In this way, a clear jump in the friction reduction of the shaft seal 10 can be achieved. The elevations 33 are advantageously distributed at equal angular distances over the periphery of the sealing lip 16. The angular division between the elevations 33 preferably amounts at most to 10°, more preferably at most 5°, for example 2°. Correspondingly, the number of elevations 33 amounts advantageously to at least 36, preferably at least 72, for example 180.

As is evident from FIG. 3, the elevations 33 are formed in such a way that the channels 34 taper outwards. Due to this feature, the pressure build-up in the channels 34 is supported.

For the same reason, the elevations 33 and/or the channels 34 are advantageously inclined against the respective radius, i.e. advantageously also have, besides the radial, a non-radial component. Due to the non-radial component, the channels 34 can be advantageously substantially longer in contrast to purely radial channels. The inclination angle β advantageously ranges between 45° and 89°, see FIG. 3. The non-radial component of the bars 33 and/or the channels 34 therefore advantageously outweighs the radial component.

The maximum height of the elevations 33 preferably ranges from 0.01 to 0.1 mm, more preferably from 0.02 to 0.06 mm, even more preferably from 0.03 to 0.05 mm. The height of the elevations 33 can preferably decrease radially outwards such that the height of the channels 34 also preferably decreases radially outwards. Due to this feature, the pressure build-up in the channels 34 is likewise supported. The elevations 33 can advantageously taper radially outwards, as is shown in FIG. 3, and/or can be rounded inwards. Overall, the elevations 33 advantageously have a wing profile in a top view.

In designs that are advantageous with respect to production, the channels 34 can also be directly integrated into the sealing lip 16 in the form of recesses. In this case, the sections 33 between the channels 34 are not designed as elevations but are part of the sealing surface 19 such that the production of elevations advantageously can be omitted.

Figure 4:
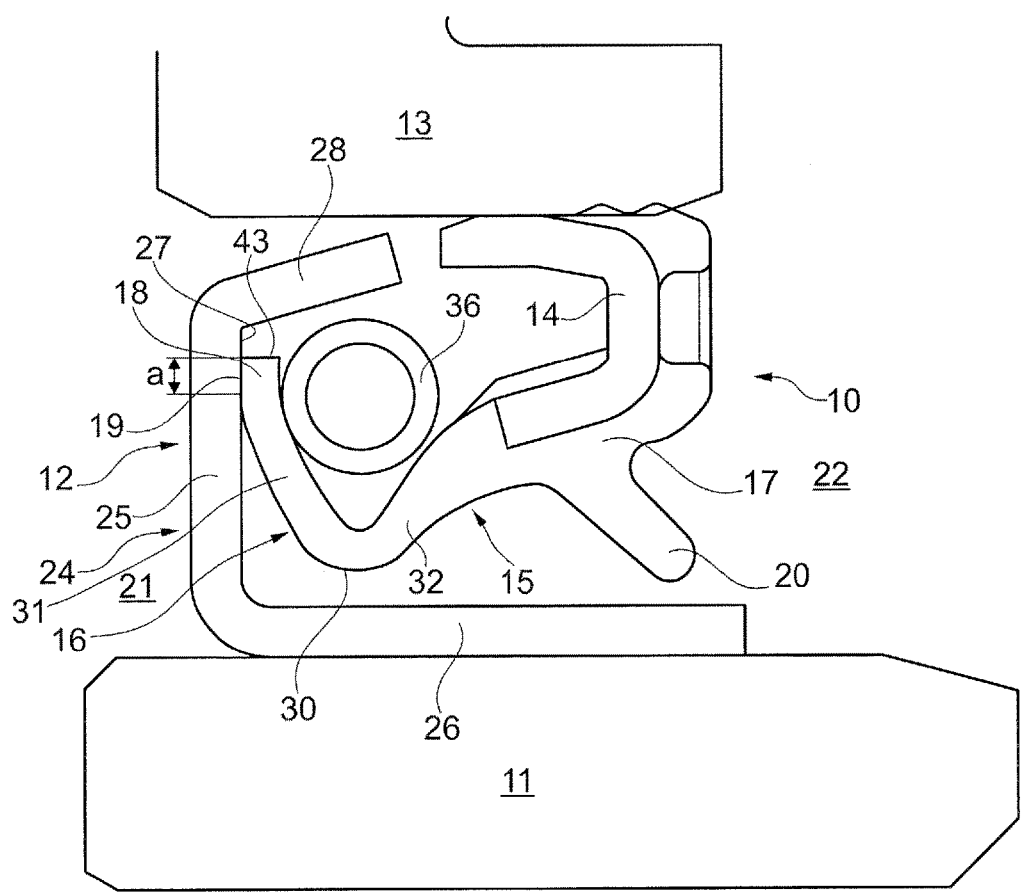
FIGS. 4 to 6 show cross-sectional views of axial shaft seals in further embodiments of the invention.

In the embodiment according to FIG. 4, a ring coil spring 36 is arranged around the outside of the sealing element 15, on the side of the sealing lip 16 facing away from the counter-running element 25, preferably between the sections 31 and 32 of the sealing lip 16. The ring coil spring 36 differs from the ring coil spring of a conventional radial shaft seal characteristically in that the (axial) sealing direction of the present shaft seal 10 is orientated perpendicularly to the (radial) effect direction of the ring coil spring 36. The ring coil spring 36 according to FIG. 4 therefore does not lead to an increased pressing force of the sealing lip 16 onto the counter-running element 25, and therefore also not to increased friction of the shaft seal 10. The function of the ring coil spring 36 consists, rather, in an increased pressure stability of the shaft seal 10, in particular against a vacuum in the space 21 to be sealed. The embodiment according to FIG. 4 can therefore be preferred in the case of engines having particularly high pressure fluctuations or vacuums. The ring coil spring 36 is preferably arranged around the sealing element 15 without preloading in the case of a stopped or low pressurised engine. The ring coil spring 36 also differs herein from the ring coil spring of a conventional radial shaft seal.

Figure 5:
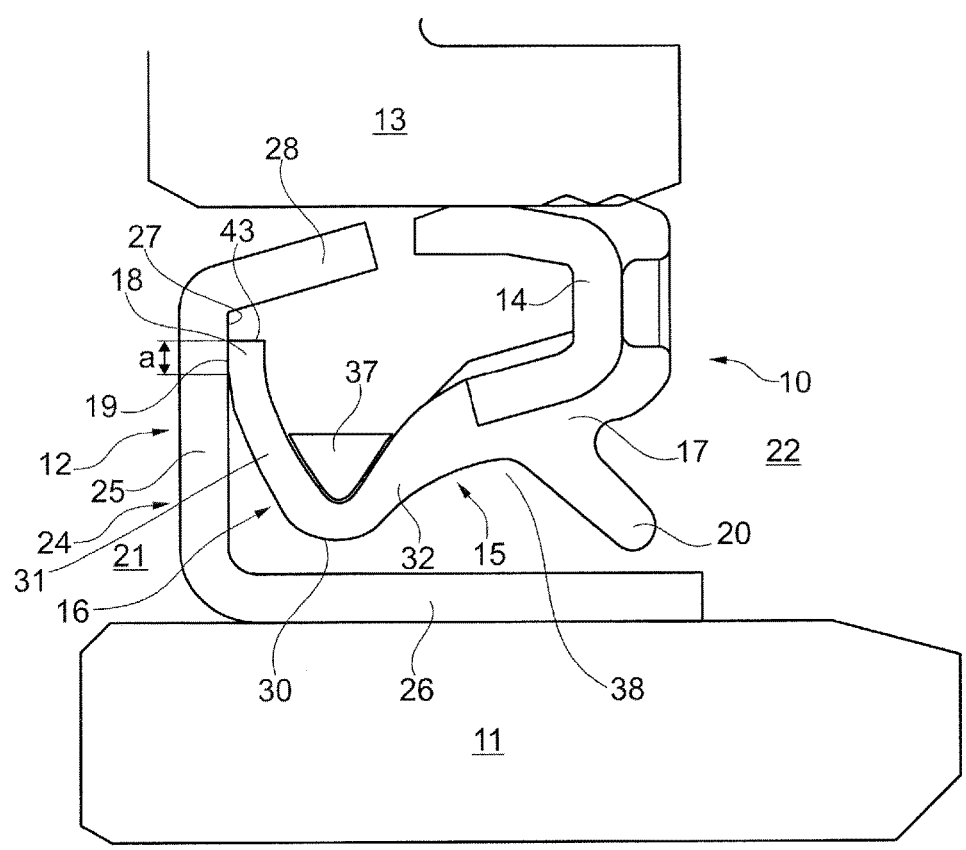

In the alternative embodiment according to FIG. 5, instead of the ring coil spring 36, an outer stiffening section 37 made from a suitable material is provided which has the same function as the ring coil spring 36 in FIG. 5. In addition or as an alternative to the outer stiffening section 37, an inner stiffening section can be provided in the region 38, i.e. on the other side of the sealing lip 16, which is in particular effective against vacuums in the space 21 to be sealed.

Figure 6:
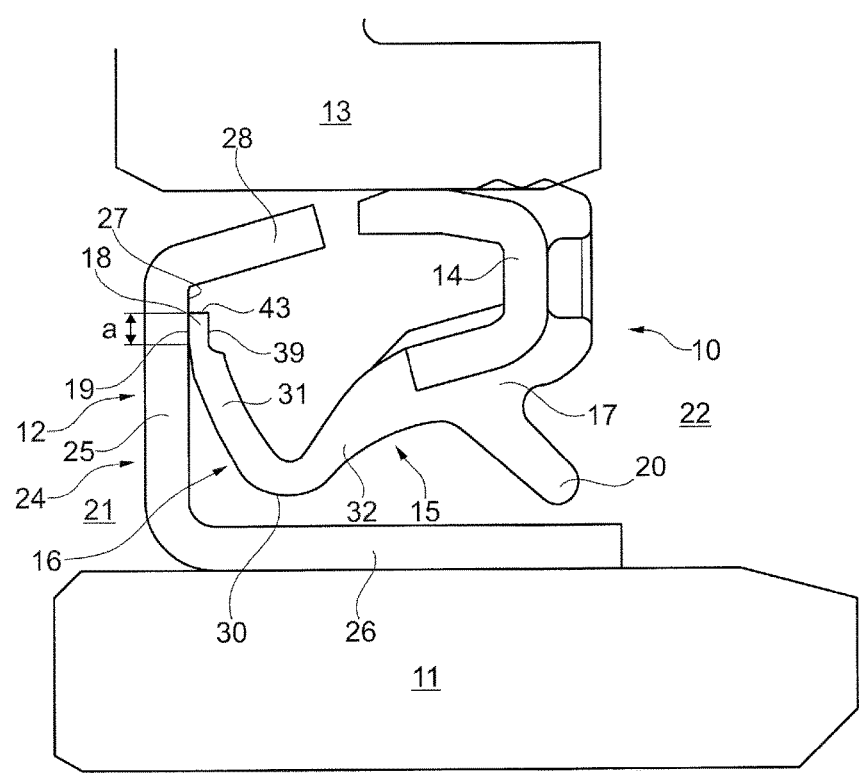

In a further embodiment according to FIG. 6, the sealing lip 16 has a peripheral weakness 39 on its free end 43 and on its side facing away from the counter-running element 25 in order to facilitate the lifting of the contact region 18 from the counter-running element 25 and therefore the transfer to air friction. The embodiment according to FIG. 6 is also able to be combined with the embodiments according to FIGS. 4 and 5. The embodiment according to FIG. 2 and/or FIG. 3 is able to be combined with any embodiment according to the FIGS. 4, 5 and/or 6.

Figure 7:
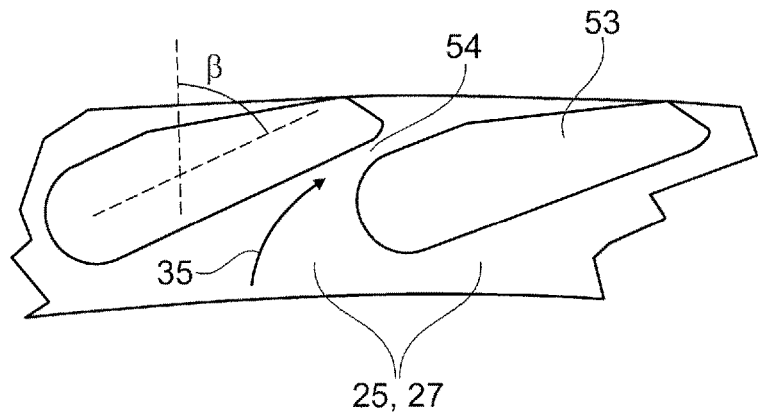
FIGS. 7 and 8 show views analogous to the views of FIG. 3 or 2, in an alternative embodiment of the invention.
Figure 8:
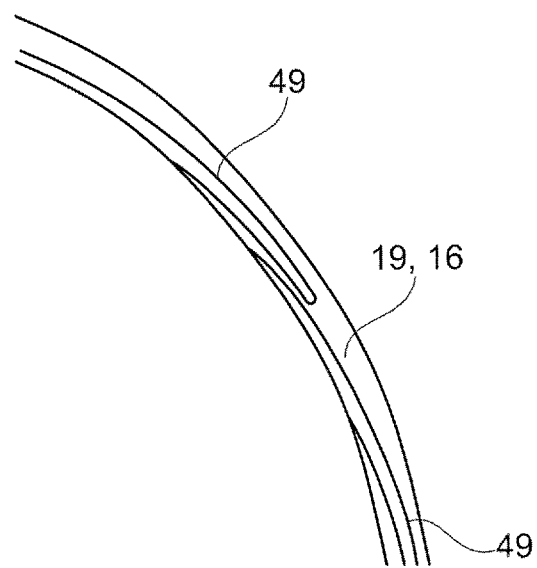

In the embodiment according to FIG. 7, alternative to the embodiment of FIG. 3, the elevations 53, instead of on the sealing lip 16, are located on the counter-running element 25 in the region of the counter-running surface 27. The design and inclination β of the elevations 53, the shape and the function of the channels 54 formed inbetween and the flow direction of the air 35 are identical to the arrangement on the sealing lip according to FIG. 3. In this embodiment, the sealing lip 16 in the contact region 19 advantageously can comprise conveyor structures 49, as shown in FIG. 8. Alternatively, the sealing lip 16 in the contact region 19 can be designed without structure.

In designs that are advantageous with respect to production, the channels 54 can also be directly integrated into the counter-running element 25 in the form of recesses. In this case, the sections 53 between the channels 54 are not designed as elevations but are part of the counter-running surface 27 such that the production of elevations advantageously can be omitted.

The embodiment according to FIG. 7 and/or FIG. 8 is able to be combined with any embodiment according to the FIGS. 4, 5 and/or 6.

EMBODIMENTS

Embodiment 1

Axial shaft seal (10) to seal a shaft (11) against a housing, comprising a stiffening section (14) and a sealing element (15) connected to the stiffening section (14), having a sealing lip (16) which is established for sealing interaction with a counter-running element (25) which is connected to the shaft (11) and runs radially, wherein a sealing contact exists exclusively between an end section (18) of the sealing lip (16) and the radial counter-running element (25) in the assembled state, characterised in that a plurality of channels (34; 54) is arranged on the side facing towards the counter-running element (25) and over the periphery of the sealing lip (16), or on the counter-running surface (27) and over the periphery of the counter-running element (25), in which a pressure build-up is caused when the shaft (11) is rotating.

Embodiment 2

Axial shaft seal according to Embodiment 1, characterised in that the channels (34; 54) taper outwards.

Embodiment 3

Axial shaft seal according to Embodiment 1 or 2, characterised in that the channels (34; 54) and/or sections (33;

53) between the channels (34; 54) are arranged to be inclined against the radial direction by an angle β.

Embodiment 4

Axial shaft seal according to Embodiment 3, characterised in that the inclination angle β ranges between 45° and 89°.

Embodiment 5

Axial shaft seal according to any one of the preceding Embodiments, characterised in that sections (33; 53) between the channels (34; 54) taper outwards and/or are rounded inwards.

Embodiment 6

Axial shaft seal according to any one of the preceding Embodiments, characterised in that the maximum depth of the channels (34; 54) ranges between 0.01 mm and 0.1 mm.

Embodiment 7

Axial shaft seal according to any one of the preceding Embodiments, characterised in that the depth of the channels (34; 54) reduces outwards.

Embodiment 8

Axial shaft seal according to any one of the preceding Embodiments, characterised in that the sealing lip (16) is U-shaped overall.

Embodiment 9

Axial shaft seal according to any one of the preceding Embodiments, characterised in that the sealing lip (16) has a section (31) which runs towards the shaft (11) originating from its free end (33) and, connecting to this, a section (32) running away from the shaft (11).

Embodiment 10

Axial shaft seal according to Embodiment 9, characterised in that the section (32) running away from the shaft (11) is at least half as long as the section (31) running towards the shaft (11).

Embodiment 11

Axial shaft seal according to Embodiment 9 or 10, characterised in that the angle α between the two sections (31, 32) of the sealing lip (16) in the assembled state ranges between 40° and 100°.

Embodiment 12

Axial shaft seal according to any one of the preceding Embodiments, characterised in that the sealing lip (16) has a peripheral weakness (39) on its free end (33) and on its side facing away from the counter-running element (25).

Embodiment 13

Axial shaft seal according to any one of the preceding Embodiments, characterised in that a ring coil spring (36) which is arranged around the outside of the sealing element (15) and acts perpendicularly to the sealing direction is provided.

Embodiment 14

Axial shaft seal according to Embodiment 13, characterised in that the ring coil spring (36) is arranged around the sealing element (15) without preloading in the case of a stopped engine.

The invention claimed is:
1. An axial shaft seal to seal a shaft against a housing, comprising:
a stiffening section; and
a sealing element connected to the stiffening section,
wherein the sealing element comprises:
a sealing lip that is configured such that, when the axial shaft seal is in an assembled state with a shaft having a counter-running element that is connected to the shaft and runs radially from the shaft, a sealing interaction is created between the sealing lip and the counter-running element, so as to seal a space to be sealed from an environment,
wherein, when the axial shaft seal is in the assembled state with the shaft, a sealing contact exists exclusively between an end section of the sealing lip and the counter-running element,
wherein a plurality of channels is:
(i) arranged on a surface of the sealing lip facing towards the counter-running element, and over a periphery of the sealing lip,
wherein the surface of the sealing lip facing towards the counter-running element has a plurality of elevations over the periphery of the sealing lip, such that the elevations of the plurality of elevations are projected or raised over the surface of the sealing lip facing towards the counter-running element, and
wherein the channels of the plurality of channels pass between the elevations of the plurality of elevations; or
(ii) arranged on a surface of the counter-running element facing towards the sealing lip,
wherein the surface of the counter-running element facing towards the sealing lip has a plurality of elevations, such that the elevations of the plurality of elevations are projected or raised over the surface of the counter-running element facing towards the sealing lip, and
wherein the channels of the plurality of channels pass between the elevations of the plurality of elevations,
such that, when the axial shaft seal is in the assembled state with the shaft, and the shaft is rotating:
(a) the channels of the plurality of channels connect the environment to the space to be sealed; and
(b) a pressure build-up is caused in the channels of the plurality of channels, from the environment to the space to be sealed.
2. The axial shaft seal according to claim 1,
wherein the channels of the plurality of channels taper radially outwards.
3. The axial shaft seal according to claim 2,
wherein the channels of the plurality of channels and/or sections between the channels of the plurality of channels are arranged to be inclined at an angle β with respect to a radial direction, where angle β is greater than 0°.

4. The axial shaft seal according to claim 1,
wherein the channels of the plurality of channels and/or sections between the channels of the plurality of channels are arranged to be with respect to a radial direction at an angle β, where angle β is greater than 0°.

5. The axial shaft seal according to claim 4,
wherein angle β is in a range from 45° to 89°.

6. The axial shaft seal according to claim 1,
wherein sections between the channels of the plurality of channels taper radially outwards and/or are rounded radially inwards.

7. The axial shaft seal according to claim 1,
wherein a maximum depth of the channels of the plurality of channels is in a range from 0.01 mm to 0.1 mm.

8. The axial shaft seal according to claim 7,
wherein a depth of the channels of the plurality of channels reduces radially outwards.

9. The axial shaft seal according to claim 1,
wherein a depth of the channels of the plurality of channels reduces radially outwards.

10. The axial shaft seal according to claim 1,
wherein the sealing lip is U-shaped.

11. The axial shaft seal according to claim 1,
wherein the sealing lip has a first section originating from a free end of the sealing lip that runs towards the shaft when the axial shaft seal is in the assembled state with the shaft, and a second section that connects to the first section and runs away from the shaft when the axial shaft seal is in the assembled state with the shaft.

12. The axial shaft seal according to claim 11,
wherein the first section is at least half as long as the second section.

13. The axial shaft seal according to claim 12,
wherein when the axial shaft seal is in the assembled state with the shaft, an angle α between the first section and the second section is in a range of 40° to 100°.

14. The axial shaft seal according to claim 11,
wherein when the axial shaft seal is in the assembled state with the shaft, an angle α between the first section and the second section is in a range of 40° to 100°.

15. The axial shaft seal according to claim 1,
wherein the sealing lip has a peripheral weakness on a free end of the sealing lip and on a side of the sealing lip that faces away from the counter-running element when the axial shaft seal is in the assembled state with the shaft.

16. The axial shaft seal according to claim 1, further comprising:
a ring coil spring,
wherein when the axial shaft seal is in the assembled state with the shaft, the ring coil spring is arranged around an outside of the sealing element and acts perpendicularly to a sealing direction.

17. The axial shaft seal according to claim 16,
wherein the ring coil spring is arranged around the outside of the sealing element without preloading.

18. The axial shaft seal according to claim 1,
wherein the plurality of channels is arranged on the surface of the sealing lip facing towards the counter-running element, and over the periphery of the sealing lip,
wherein the surface of the sealing lip facing towards the counter-running element has the plurality of elevations over the periphery of the sealing lip,
wherein the elevations of the plurality of elevations are distributed at equal angular divisions over the periphery of the sealing lip, and
wherein the equal angular divisions between the elevations of the plurality of elevations are less than or equal to 10°, such that a number of elevations of the plurality of elevations is at least 36.

19. The axial shaft seal according to claim 1,
wherein, when the axial shaft seal is in the assembled state with the shaft, and the shaft is rotating, air is spun radially outward on the counter-running element and pushed into the channels of the plurality of channels, and causes the pressure build-up in the channels of the plurality of channels, from the environment to the space to be sealed.

\* \* \* \* \*